United States Patent [19]
van der Lely

[11] Patent Number: 4,465,143
[45] Date of Patent: Aug. 14, 1984

[54] ROTARY HARROWS

[76] Inventor: Cornelis van der Lely, 7, Brüschenrain, Zug, Switzerland

[21] Appl. No.: 62,028

[22] Filed: Jul. 30, 1979

Related U.S. Application Data

[63] Continuation of Ser. No. 593,501, Jul. 7, 1975, abandoned.

[51] Int. Cl.³ .............................................. A01B 33/06
[52] U.S. Cl. .................................................. 172/49.5
[58] Field of Search .................. 172/59, 111, 125, 776, 172/49.5; 308/189 R

[56] References Cited

U.S. PATENT DOCUMENTS

| | | | |
|---|---|---|---|
| 3,111,917 | 11/1963 | Dawrs | 172/59 X |
| 3,765,787 | 10/1973 | Hart et al. | 308/189 R X |
| 3,774,688 | 11/1973 | Lely et al. | 172/59 X |

FOREIGN PATENT DOCUMENTS

| | | | |
|---|---|---|---|
| 545002 | 6/1956 | Italy | 172/111 |
| 158746 | 3/1964 | U.S.S.R. | 172/59 |

Primary Examiner—Paul E. Shapiro
Attorney, Agent, or Firm—Penrose Lucas Albright

[57] ABSTRACT

A rotary harrow has an elongated hollow frame portion that extends transverse to the direction of travel. The frame portion comprises three spaced apart sheet walls that define an upper chamber and a lower chamber. Driving means, including meshed pinion gears in the upper chamber and bearing housings in the lower chamber, receive and support upwardly extending shafts of soil working members. The soil working members have downwardly extending tools that are rotated by the pinions and their shafts are journalled in bearings held between the upper and lower walls of the lower chamber. The upper wall of the lower chamber forms the lower wall of the upper chamber. All three walls are bent at their front and rear sides to provide portions with rims that are joined to one another by bolt fastenings.

7 Claims, 4 Drawing Figures

ROTARY HARROWS

This application is a continuation of Ser. No. 593,501, filed July 7, 1975, now abandoned.

Figure 1:
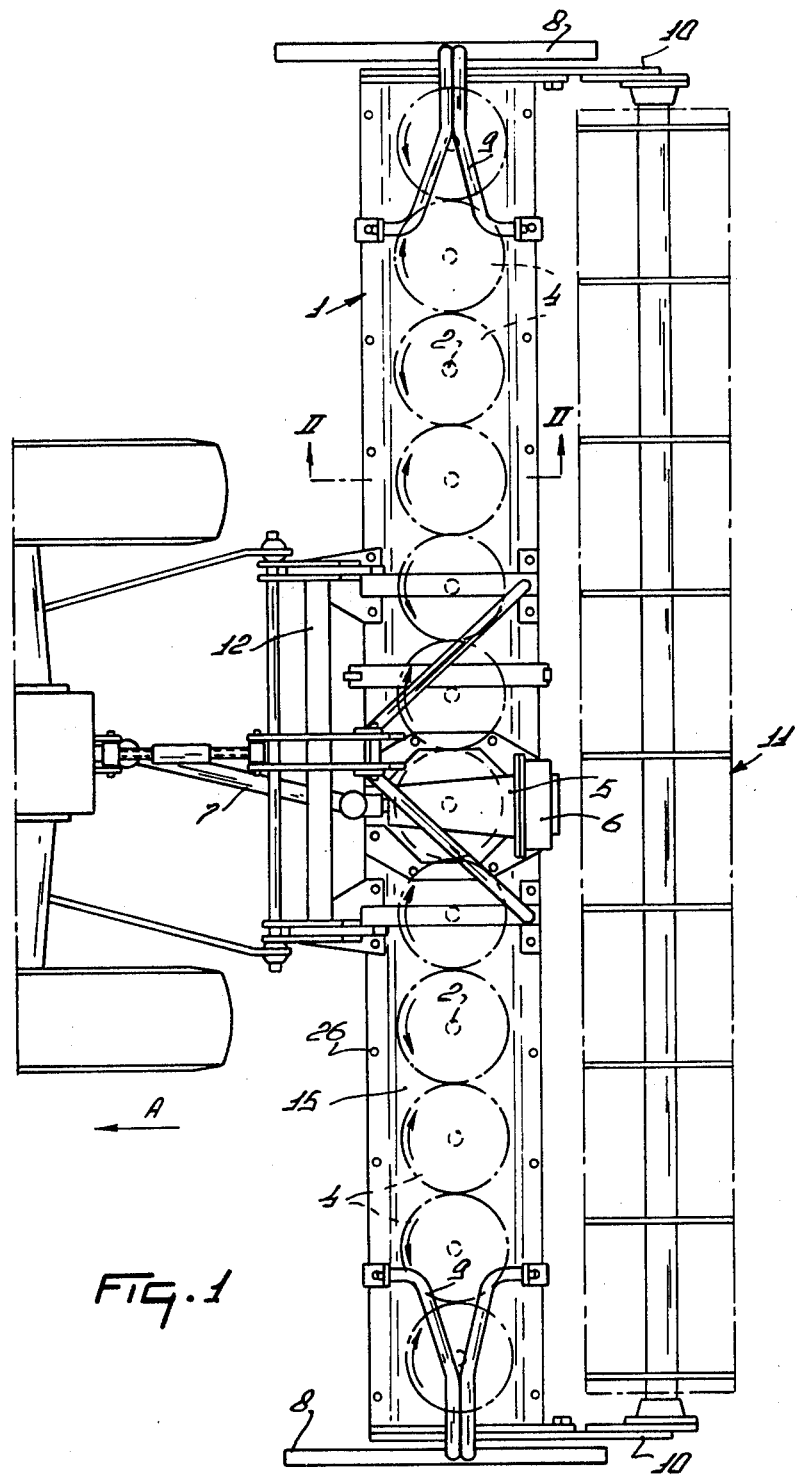
Figure 2:
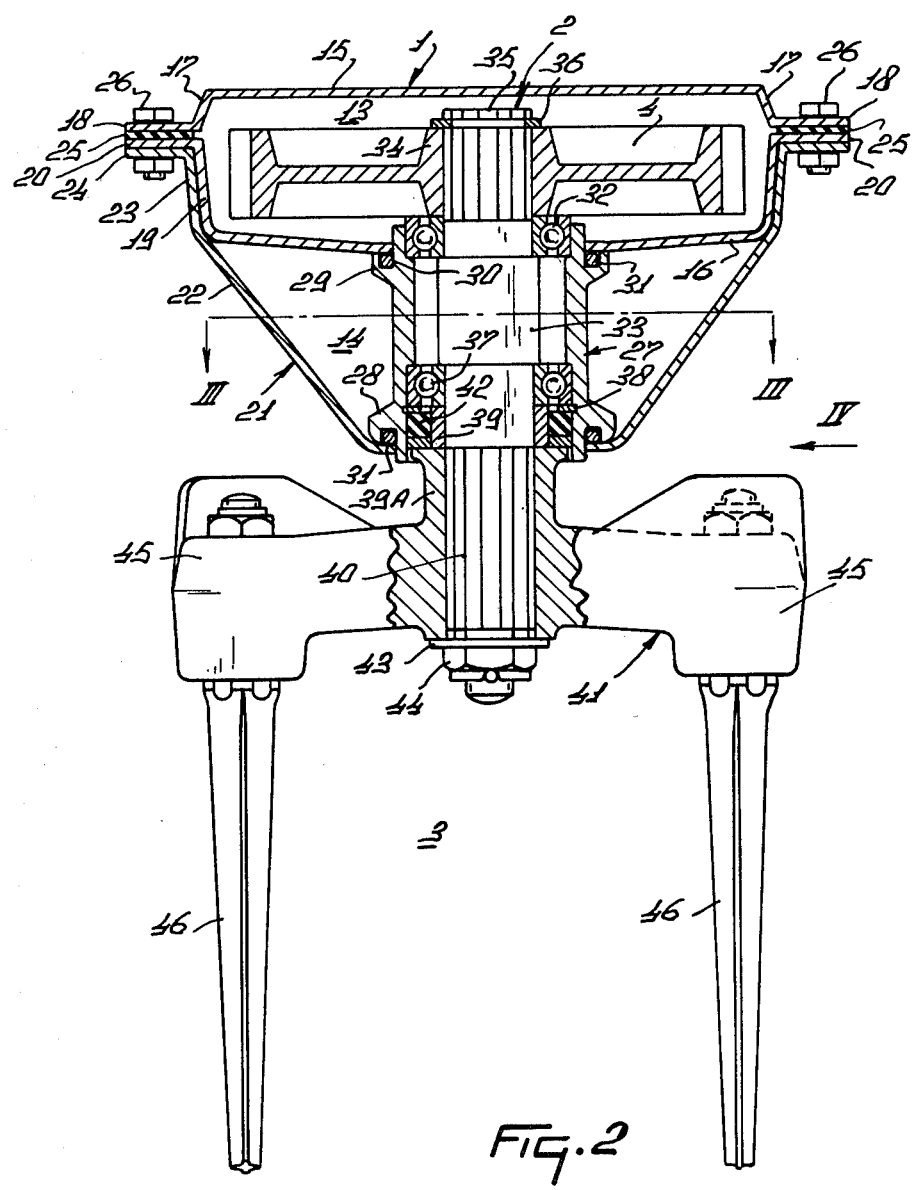
Figure 3:
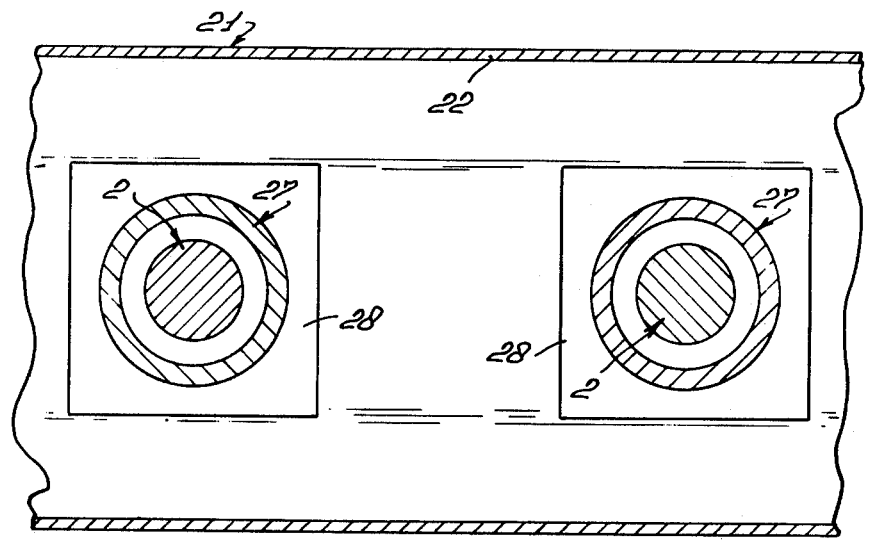
Figure 4:
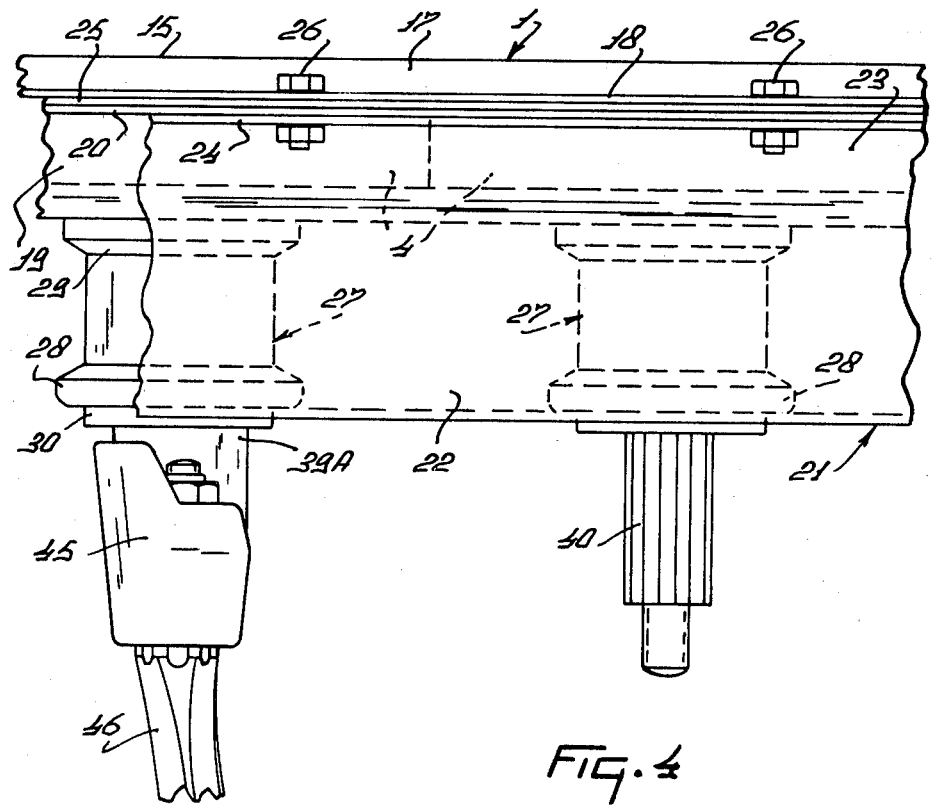

For a better understanding of the invention, and to show how the same may be carried into effect, reference will now be made, by way of example, to the accompanying drawings, in which:

FIG. 1 is a plan view of a soil cultivating implement or rotary harrow in accordance with the invention connected to the rear of an agricultural tractor, FIG. 2 is a part-sectional elevation, to an enlarged scale, the section being taken on the line II—II in FIG. 1, FIG. 3 is a section taken on the line III—III in FIG. 2, and FIG. 4 is an elevation as seen in the direction indicated by an arrow IV in FIG. 2.

The soil cultivating implement or rotary harrow that is illustrated in the accompanying drawings will hereinafter be referred to, throughout the descriptive portion of this Specification, merely as a "rotary harrow" for the sake of brevity. The rotary harrow has a hollow box-shaped frame portion 1 that extends substantially horizontally transverse, and normally substantially horizontally perpendicular, to the intended direction of operative travel of the harrow which is indicated by an arrow A in FIG. 1 of the drawings. The construction of the frame portion 1 will be discussed in greater detail below. A plurality (in this case, twelve) of soil working members 3 are rotatably mounted in a single row beneath the frame portion 1 on corresponding upwardly extending, and normally substantially vertical, shafts 2 whose axes of rotation are spaced apart from one another at regular intervals which should not be greater than 30 centimeters and which it is preferred should have magnitudes of substantially 25 centimeters. Each shaft 2 is provided, inside the hollow frame portion 1 in a manner which will be discussed in greater detail below, with a corresponding straight- or spur-toothed pinion 4, the single row of twelve pinions 4 being arranged so that the teeth of each pinion are in mesh with those of its neighbour, or of both of its neighbours, in said row. One of the shafts 2 that corresponds to the center pair of soil working members 3 of the single row thereof has an upward extension into a gear box 5 that is fastened on top of the frame portion 1. A bevel pinion carried by the shaft extension inside the gear box 5 has its teeth in mesh with those of a further pinion mounted on a substantially horizontal shaft (not visible) that extends substantially parallel to the direction A. The rearmost end of this substantially horizontal shaft with respect to the direction A and the rearmost end of an overlying and substantially parallel shaft both project through a rear wall of the gear box 5 into a changespeed gear 6. The ends of the two substantially horizontal shafts that extend into the change-speed gear 6 are both splined and can receive a chosen co-operating pair of straight- or spur-toothed pinions selected from a number of co-operating pairs of exchangeable and/or interchangeable pinions. The pair of pinions that is chosen dictates the transmission ratio between the two substantially horizontal shafts that extend substantially parallel to the direction A. The change-speed gear has a readily releasable cover which, when it is fastened in position, protects the chosen pair of pinions and the lubricant therefor from contamination by dirt. The leading end, with respect to the direction A, of the upper substantially horizontal shaft projects forwardly from the front of the gear box 5 and is there splined or otherwise keyed to enable it to be placed in driven connection with the power take-off shaft at the rear of an agricultural tractor or other operating vehicle by way of an intermediate telescopic transmission shaft 7, that is of a construction which is known per se, having universal joints at its opposite ends.

Substantially vertically disposed shield plates 8 are located immediately beyond the oppste ends of the single row of soil working members 3 in such positions that they both extend substantially parallel to the direction A. The lowermost edge of each shield plate 8 is arranged to slide over the ground surface in substantially the direction A and each shield plate 8 is pivotably connected, by a corresponding pair of arms 9, to brackets on top of the frame portion 1. The pivotal connections of the arms 9 to the brackets define axes that extend substantially horizontally parallel to the direction A so that, during operation of the harrow, the shield plates 8 can move upwardly and downwardly about the corresponding axes to match undulations in the surface of the soil over which the harrow is travelling. The shield plates 8 serve to minimise the formation of ridges at the edges of the broad strip of soil that is worked by the harrow and to prevent stones and the like from being flung laterally by the rapidly rotating soil working members 3, thus greatly reducing the danger to bystanders and to property. The opposite ends of the hollow frame portion 1 are closed by substantially vertical plates that extend substantially parallel to the direction A and arms 10 are turnable upwardly and downwardly alongside the corresponding end plates about substantially horizontally aligned strong pivots (not visible in the drawings) that are located at the tops and fronts of said end plates with respect to the direction A. Rear edge regions of the end plates are formed with arcuately curved slots, or with curved rows of holes, the center of curvature of said slots or rows of holes being coincident with the axis that is defined by the pivotal connections of the arms 10 to the end plates of the frame portion 1. The arms 10 are formed with single holes and bolts whose heads can be seen in FIG. 1 of the drawings are entered through those single holes and through the slots, or chosen holes, in the end plates and can be tightened to retain the arms 10 in corresponding angular settings about the axis defined by the strong pivots mentioned above relative to the frame portion 1 and thus to the remainder of the harrow. Lowermost and rearmost end regions of the arms 10 with respect to the direction A have a rotatable supporting member in the form of an open ground roller 11 rotatably mounted between them and it will be realised that the angular settings of the arms 10 which are chosen relative to the remainder of the harrow dictate the level of the axis of rotation of the roller 11 relative to the remainder of the harrow. This adjustment is a principal factor in determining the depth to which tines 46 of the soil working members 3 can penetrate into the soil during the operation of the harrow. A coupling member or trestle 12, which may be of a generally triangular configuration, is rigidly mounted at the front of the frame portion 1 with respect to the direction A and is constructed and arranged to enable the harrow to be connected to the three-point lifting device or hitch of an operating agricultural tractor or other vehicle in a manner which is generally known per se and which is illustrated in outline in FIG. 1 of the drawings.

It can be seen from FIG. 2 of the drawings that the interior of the hollow frame portion 1 is formed as an upper chamber 13 and a separate, lower chamber 14. The longitudinal axes of the two chambers 13 and 14 extend substantially horizontally parallel to one another in a direction which is normally substantially perpendicular to the direction A. The upper chamber 13 has a substantially oblong cross-section while the lower chamber 14 has a substantially trapezoidal cross-section. The upper chamber 13 is defined principally by a sheet steel or other sheet material upper wall 15 and by a sheet steel or other sheet material lower wall 16. The upper wall 15 has a major substantially horizontal portion which is flanked at the front and rear, with respect to the direction A, by symmetrically identical front and rear portions 17 that are bent over downwardly and whose lowermost edges merge, by way of bends, into corresponding rims 18 that are both substantially horizontally disposed in parallel relationship with the major horizontal portion of the upper wall 15. The rims 18 extend thoughout the length of the upper wall 15 (in a direction substantially perpendicular to the direction A). The lower wall 16 has a central substantially horizontal portion which is flanked, at the front and rear thereof, by slightly upwardly inclined portions whose front and rear edges, respectively, are connected by bends to corresponding nearly vertically disposed front and rear portions 19. The upper edges of the rims 19 merge, by way of further bends, into substantially horizontal front and rear rims 20. The symmetrically identical front and rear portions 19 of the lower wall 16 have heights that are not less than three times the heights of the downwardly directed front and rear portions 17 of the upper wall 15. The front and rear portions 17 of the wall 15 and the front and rear portions 19 of the wall 16 are bent over downwardly and upwardly, respectively, through substantially the same angles relative to the major portions of the upper and lower walls 15 and 16 and said portions 17 and 19 together constitute upright front and rear walls of the hollow frame portion 1.

The top of the lower chamber 14 is afforded by the horizontal and substantially horizontal portions of the lower wall 16 of the upper chamber 13 but its bottom and front and rear, with respect to the direction A, are afforded by a sheet steel or other sheet material wall 21 having a central substantially horizontal portion and front and rear upwardly inclined portions 22 that are both substantially flat. At the level of the lower edges of the front and rear portions 19 of the lower wall 16 of the upper chamber 13, said front and rear portions 22 of the lower chamber 14 are sharply bent over upwards to produce wall portions 23 which abut against the external surfaces of the respective front and rear portions 19. Upper edge regions of the two wall portions 23 are bent over outwardly to form substantially horizontal rims 24 that lie beneath the rims 20 in abutting engagement therewith. As can be seen in FIG. 2 of the drawings, the rims 18 of the upper wall 15 and the rims 20 of the lower wall 16 of the upper chamber 13 would be in abutting engagement with one another but for the provision of an intervening gasket 25. The three rims 18, 20 and 24, and the gasket 25, are clamped together by substantially vertical bolts 26 that are provided at more or less regular intervals along said rims.

The substantially horizontal central portion of the lower wall 16 of the upper chamber 13 and the substantially horizontal central portion of the wall 21 of the lower chamber 14 are formed with substantially vertically aligned holes at regular intervals along their lengths, the center of said holes being spaced apart from one another lengthwise of the row of soil working members 3 by the distances that are required for the spacings between the axes of rotation of the shafts 2 (i.e., preferably substantially 25 centimeters). Each upper and lower pair of holes has a corresponding bearing housing 27 clamped therein between said walls 16 and 21, upper and lower ends of said housings 27 being of circular formation and being dimensioned to fit in the holes. Firm clamping of the bearing housings 27 in their appointed positions is obtained when the bolts 26 are tightened because each housing has a lower shoulder 28 and an upper shoulder 29 that bear against regions of the corresponding walls 21 and 16 that immediately surround the holes. The shoulders 28 and 29 are formed with circular grooves which receive oil sealing rings 31 and 30 respectively but it will be noted from FIG. 3 of the drawings that the lower shoulders 28 are of substantially square peripheral configuration so that the bearing housings 27 cannot turn about their own upright longitudinal axes because the front and rear upwardly inclined portions 22 of the wall 21 co-operate with the shoulders 28 to block such turning movements.

Each bearing housing 27 carries, at its upper end, a corresponding ball bearing 32 whose inner race is enclosed between a long plain shoulder 33 of the corresponding shaft 2 and the hub 34 of the corresponding toothed pinion 4. The long plain shoulder 33 of each shaft 2 extends axially throughout a major portion of the length of the corresponding bearing housing 27. Each upper ball bearing 32 projects axially a short distance beyond the upper end of the corresponding housing 27 into the upper chamber 13 which chamber encloses the corresponding toothed pinion 4 whose internally splined hub 34 is received on an upper splined portion 35 of the shaft 2. Each pinion 4 is prevented from upward axial displacement relative to its corresponding shaft portion 35 by a circlip 36 that is engaged in a narrow groove close to the extreme upper end of the splined portion 35 concerned. A lower ball bearing 37 is located internally of the lower end of the corresponding bearing housing 27 with its inner race against the end of the long plain shoulder 33 that is remote from the upper bearing 32. The upper and lower ball bearings 32 and 37 are identical and the outer race of the lower bearing 37 is engaged between an internal shoulder of the corresponding housing 27 and a circlip 38 whose convex outer edge is received in a groove in the inner surface of the housing 27 immediately beneath the bearing 37. A short sleeve 39 surrounds a plain portion of the shaft 2 immediately beneath the inner race of the lower ball bearing 37, the lower end of said sleeve 39 abutting against the upper end of an internally splined hub 39A of a tine or other tool support 41 of the corresponding soil working member 3. The internally splined hub 39A co-operates with a lower splined portion 40 of the shaft 2. An oil seal 42 extends between the circlip 38 and the upper end of the support hub 39A, its internal surface surrounding the short sleeve 39 and its external surface bearing against the interior of the housing 27. A short screwthreaded stub shaft is formed at the lowermost end of the shaft 2 and the tine or other tool support 41 is retained in its appointed position on the lower splined portion 40 of that shaft by a washer 43 and a fastening nut 44 screwed onto said stub shaft. A split pin or the like is entered through a transverse bore in the screwthreaded stub shaft to prevent unwanted loosening of the fastening nut 44. The tine or other tool support 41 extends substantially horizontally from opposite sides of its hub 39A and its outermost ends are provided with corresponding substantially vertically disposed and substantially cylindrical tine or other tool holders 45. Upper fastening portions of the tines 46, or of other tillage tools, are firmly, but releasably, secured in the holders 45 and active or soil working portions of said tines or other tools extend substantially vertically downwards from the holders 45 in parallel or substantially parallel relationship with the axis of rotation of the corresponding shaft 2. Actually, when the tines 46 are employed, the active or soil working portions thereof are inclined rearwardly from top to bottom by a few degrees with respect to the intended directions of rotation of the corresponding soil working members 3 (see the arrows in FIG. 1 of the drawings) so that said tines 46 may be said to "trail" to some extent with respect to those directions.

In the use of the rotary harrow which has been described, its coupling member or testle 12 is connected to the three-point lifting device or hitch at the rear of an operating agricultural tractor or other vehicle and the rotary input shaft that projects forwardly from the front of the gear box 5 with respect to the direction A is placed in driven connection with the power take-off shaft of the same tractor or other vehicle by the telescopic transmission shaft 7. The angular settings of the arm 10 are chosen to allow the tines 46 or other tillage tools to penetrate into the soil to the required depth and an appropriate pair of co-operating pinions is arranged in the chagespeed gear 6 to produce a faster, or slower, speed of rotation of the soil working members 3 in response to a substantially constant input speed of rotation applied to the gear box 5 from the power take-off shaft of the operating tractor or other vehicle. The tine depth and speed of soil working member rotation adjustments are made having regard to the initial nature and condition of the soil that is to be cultivated and the degree of fineness of the soil that is required after it has been treated. As the harrow moves operatively over the soil in the direction A, each soil working member 3 rotates in the opposite direction to its immediate neighbour, or both of its immediate neighbours, in the single row thereof as indicated by arrows in FIG. 1 of the drawings. Since the distance between the tips of the two tines 46 or other tillage tools of each soil working member 3 is a little greater than is the distance between the axes of rotation of immediately neighbouring members 3, the twelve soil working members 3 work overlapping strips of soil to produce, in effect, a single broad strip of worked soil. The pinions 4 are located in the upper chamber 13 of the hollow frame portion 1, the two chambers 13 and 14 of that frame portion being constructed principally from the sheet steel or other sheet material walls 15, 16 and 21. The walls 15 and 21 are external walls of the frame portion 1 whereas the wall 16 is a partition which separates the upper chamber 13 from the lower chamber 14. Not only does the described and illustrated construction give the frame portion 1 a high degree of rigidity, but also provides a most effective way of mounting the bearing housings 27 in their appointed positions. The housings 27 for the upper and lower ball bearings 32 and 37 are clamped in a simple manner in their appointed positions merely by tightening the bolts 26 and the construction and assembly are simplified, and made less expensive, by employing identical upper and lower bearings 32 and 37. Since the upper ball bearings 32, as well as the lower ball bearings 37, are located beneath the pinions 4, breakage of at least one ball bearing due to damage or structural failure tends to result in the loose and/or broken parts of the or each such broken bearings passing downwardly under gravity to locations where they will not become trapped between the teeth of the pinions 4 and also break or damage those pinions 4. A further very significant simplification of the manufacture and assembly results from employing only a single one of the bearing housings 27, with two identical ball bearings 32 and 37, for the rotary support of each shaft 2.

Although various features of the rotary harrow that have been described, and/or that are illustrated in the accompanying drawings, will be set forth in the following claims as inventive features, it is emphasised that the invention is not necessarily limited to those features and that it includes each of the parts of the rotary harrow that has been described and/or that is illustrated in the accompanying drawings both individually and in various combinations.

What we claim is:

1. A rotary harrow comprising a frame movable over the ground and said frame including an elongated hollow portion that extends transverse to the direction of travel, a plurality of soil-working members supported on said portion below same and said members being mounted side-by-side on corresponding upwardly extending shafts that are journalled in said frame portion, said portion being comprised of at least three vertically spaced apart wall sheets and said wall sheets forming an upper wall, a bottom wall and an intermediate lower wall, said walls defining two chambers, one above the other, within said portion and said chambers being elongated with their lengths co-extending substantially horizontally and parallel to one another, said shafts being journalled in said bottom and intermediate walls, driving means connected to said shafts and said driving means comprising a pinion on each shaft, said pinion being located in the upper chamber and a bearing housing on said shaft located in the lower chamber, fastening means clamping said bearing housing between said bottom and lower walls, means on the lower end of said bearing housing securing same and preventing that housing from turning relative to said frame portion, said bearing housing having upper and lower shoulders that bear on said bottom and lower walls, and said lower shoulder having a polygonal periphery.

2. A harrow as claimed in claim 1, wherein said shoulders each have an uninterrupted recess that receives a corresponding oil sealing ring.

3. A rotary harrow comprising a frame movable over the ground and said frame including an elongated hollow portion that extends transverse to the direction of travel, a plurality of soil-working members supported on said portion below the same and said members being mounted side-by-side on corresponding upwardly extending shafts that are journalled in said frame portion, said portion being comprised of a top sheet wall, an intermediate lower wall and a bottom wall, said walls defining two chambers within said portion, said chambers being elongated and located one above the other, said upper chamber being substantially oblong in cross-section and said lower chamber being substantially trapezoidal in cross-section, the lengths of said chambers co-extending substantially horizontally and parallel to one another, said shafts being journalled in bearings supported in housings located between said lower and bottom walls, driving means comprising pinions on said shafts, said pinions being in mesh with one another and located in said upper chamber, means clamping the bearing housings, in their appointed positions in said lower chamber, the outer rims of all three walls being fastened to one another by fastening means that clamp said housings between the lower and bottom walls.

4. A harrow as claimed in claim 3, wherein the upper and lower walls of said upper chamber have substantially symmetrically identical, respectively downwardly and upwardly orientated, front and rear side portions, the front side portions and the rear side portions of said upper and lower walls extending towards each other.

5. A harrow as claimed in claim 4, wherein the front and rear side portions of said bottom walls each have a height which is not less than three times the height of the front and rear side portions of said upper wall.

6. A harrow as claimed in claim 5, wherein, between the side portions of said lower wall a central portion is located, said central portion having front and rear parts that are slightly inclined to the horizontal, said parts being inclined downwardly towards one another, when seen in cross-section, and being separated by a subtantially horizontal part of said lower wall.

7. A harrow as claimed in claim 6, wherein said lower chamber is defined by the lower wall of the upper chamber and by said bottom wall, said bottom wall having a central substantially flat portion between front and rear upwardly inclined portions, said front and rear upwardly inclined portions being bent upwardly adjacent outer rims thereof to form corresponding front and rear side portions which co-extend and bear against said front and rear side portions of the lower wall.

* * * * *